US012646102B1

(12) United States Patent
Zhang et al.

(10) Patent No.: US 12,646,102 B1
(45) Date of Patent: Jun. 2, 2026

(54) GENERATION OF SYNTHETIC SUPPLY CHAIN DATA FOR TRAINING VENDOR LEAD TIME MODELS

(71) Applicant: Amazon Technologies, Inc., Seattle, WA (US)

(72) Inventors: Qi Zhang, Bothell, WA (US); Shaoyang Zhou, Austin, TX (US); Zhongbo Geng, Seattle, WA (US); Ran Cheng, Austin, TX (US); Tong Jiang, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 390 days.

(21) Appl. No.: 18/194,567

(22) Filed: Mar. 31, 2023

(51) Int. Cl.
| | |
|---|---|
| *G06Q 30/00* | (2023.01) |
| *G06N 5/022* | (2023.01) |
| *G06Q 10/087* | (2023.01) |
| *G06Q 30/0601* | (2023.01) |

(52) U.S. Cl.
CPC ......... G06Q 30/0633 (2013.01); G06N 5/022 (2013.01); G06Q 10/087 (2013.01)

(58) Field of Classification Search
CPC . G06Q 30/06–08; G06Q 10/087; G06N 5/022
See application file for complete search history.

(56) References Cited

U.S. PATENT DOCUMENTS

| | | | | |
|---|---|---|---|---|
| 8,700,443 | B1 * | 4/2014 | Murray | ................ G06Q 10/087 705/7.31 |
| 10,133,949 | B2 | 11/2018 | Taranta, II | |
| 11,537,880 | B2 * | 12/2022 | Kursun | ................ G06F 18/214 |
| 11,887,044 | B2 * | 1/2024 | Williams | ................ G06N 5/01 |
| 2009/0150663 | A1 | 6/2009 | Perry | |
| 2010/0125486 | A1 * | 5/2010 | Sinclair | .............. G06Q 30/0202 705/7.31 |
| 2010/0125487 | A1 | 5/2010 | Sinclair | |

(Continued)

OTHER PUBLICATIONS

S. Lundberg, "Welcome to the SHAP Documentation," 2018. [Online]. Available: https://shap.readthedocs.io/en/latest/index.html. [Accessed Mar. 4, 2023], pp. 1-23.

(Continued)

*Primary Examiner* — Ethan D Civan
(74) *Attorney, Agent, or Firm* — Robert C. Kowert; Kowert, Hood, Munyon, Rankin & Goetzel, P.C.

(57) ABSTRACT

Embodiments of a supply chain management system (SCMS) are disclosed that enable the generation of synthetic supply chain activity data for developing machine learning models, such as models for predicting vendor lead times (VLTs) of purchase orders fulfilled by a supply chain network. In embodiments, the generation process is performed over successive time periods to simulate dynamically changing variables of the supply chain network, including inventory levels, product demand, and stock manager decisions. The generation process may also be used to generate synthetic data to simulate elements within the supply chain network, such as simulated warehouses, vendors, or products. The disclosed SCMS is able to generate highly realistic training data that simulates the operations within the supply chain network, which can be used to improve the performance of machine learning models.

20 Claims, 8 Drawing Sheets

(56) References Cited

U.S. PATENT DOCUMENTS

| | | | |
|---|---|---|---|
| 2020/0012933 A1 | 1/2020 | Truong | |
| 2020/0111033 A1* | 4/2020 | Mahajan | G06Q 10/04 |
| 2020/0210947 A1* | 7/2020 | Devarakonda | G06Q 10/06312 |
| 2021/0192435 A1* | 6/2021 | Fernandes | G06Q 10/087 |
| 2022/0318711 A1* | 10/2022 | Recasens | G06Q 10/06315 |
| 2023/0101023 A1* | 3/2023 | Jin | G06Q 10/087 |
| | | | 705/7.31 |
| 2024/0005177 A1* | 1/2024 | Singh | G06N 3/09 |

OTHER PUBLICATIONS

Microsoft Corporation, "Welcome to LightGBM's documentation," Microsoft Corporation, 2021. [Online]. Available: https://lightgbm.readthedocs.io/en/latest/index.html. [Accessed Mar. 4, 2023], pp. 1-9.

X. developers, "XGBoost Documentation," 2020. [Online]. Available: https://xgboost.readthedocs.io/en/latest/. [Accessed Mar. 4, 2023], pp. 1-3.

R. Tibshirani, "Relative Importance of Predictor Variables," in The Elements of Statistical Learning: Data Mining, Inference, and Prediction, Second Edition , Springer, 2016, p. 367. Available: https://hastie.su.domains/Papers/ESLII.pdf. [Accessed Mar. 4, 2023], pp. 1-5.

Gavriel State. "Nvidia Omniverse and Drive Sim Synthetic Data Generation for AV Training and Validation: Nvidia on-Demand." NVIDIA, Available: https://www.nvidia.com/en-us/on-demand/session/gtcspring21-s32042/. [Accessed Mar. 4, 2023], pp. 1-3.

Sankaranarayanan, Swami, et al. "Learning from synthetic data: Addressing domain shift for semantic segmentation." Proceedings of the IEEE conference on computer vision and pattern recognition. 2018, pp. 1-10.

Data Pipeline—Data Engineering Wiki, Available: https://dataengineering.wiki/Concepts/Data+Pipeline. [Accessed Mar. 4, 2023], pp. 1-3.

"What a Machine Learning Pipeline Is and Why It's Important." DataRobot AI Cloud, Jul. 4, 2022, Available: https://www.datarobot.com/blog/what-a-machine-learning-pipeline-is-andwhy-its-important/. [Accessed Mar. 4, 2023], pp. 1-5.

ForePaaS. "Data Pipelines vs. ML Pipelines—Similarities and Differences (Part 2)." ForePaaS, Dec. 23, 2021, Available: https://www.forepaas.com/en/blog/data-pipelines-aipipelines-2/. [Accessed Mar. 4, 2023], pp. 1-9.

* cited by examiner

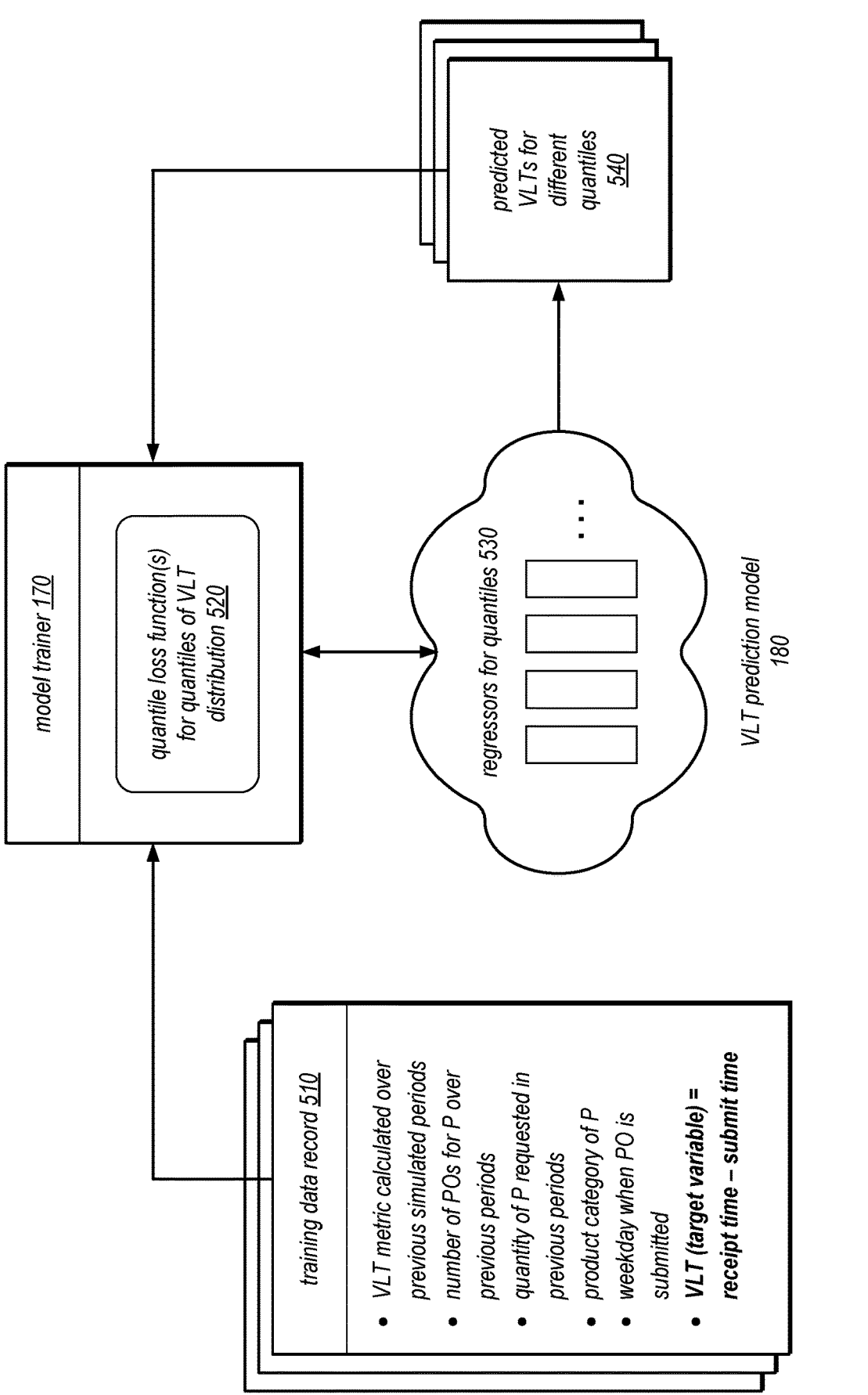

FIG. 5 predicted VLTs for different quantiles 540 model trainer 170 quantile loss function(s) for quantiles of VLT distribution 520 regressors for quantiles 530

VLT prediction model 180 training data record 510

- VLT metric calculated over previous simulated periods
- number of POs for P over previous periods
- quantity of P requested in previous periods
- product category of P
- weekday when PO is submitted
- VLT (target variable) = receipt time − submit time

GENERATION OF SYNTHETIC SUPPLY CHAIN DATA FOR TRAINING VENDOR LEAD TIME MODELS

BACKGROUND

As the world economy becomes more integrated, company supply chains are growing more complex. Modern supply chain networks must cope with simultaneous challenges of timely responding to large numbers of diverse inventory requests and efficiently utilizing system resources, including space, equipment, and manpower. Recently, companies have outsourced their supply chain management to third party management systems in the cloud, which can integrate with the company's internal enterprise resource planning (ERP) systems and provide a variety of machine learning (ML)-powered management tools to, for example, generate insights from supply chain data, monitor the health of the supply chain network, optimize supply chain decisions making, and recommend or automate certain supply chain actions.

However, in many cases, ML-powered features in these systems cannot be used because the supply chain data needed to train the machine learning models are not readily available. For example, the customer may not have adequate data due to insufficient history or poor logging. As another example, the customer may not be able to provide such data to a third party because the data is business sensitive. This lack of supply chain data prevents companies from taking full advantage of the ML-based analytic tools offered by modern supply chain management systems, and generally reduces the utility of these supply chain management systems.

BRIEF DESCRIPTION OF THE DRAWINGS

FIG. 5 illustrates an example training process for training a vendor lead time (VLT) prediction model based on synthetic supply chain data generated by the SCMS, according to some embodiments.

Figure 1:
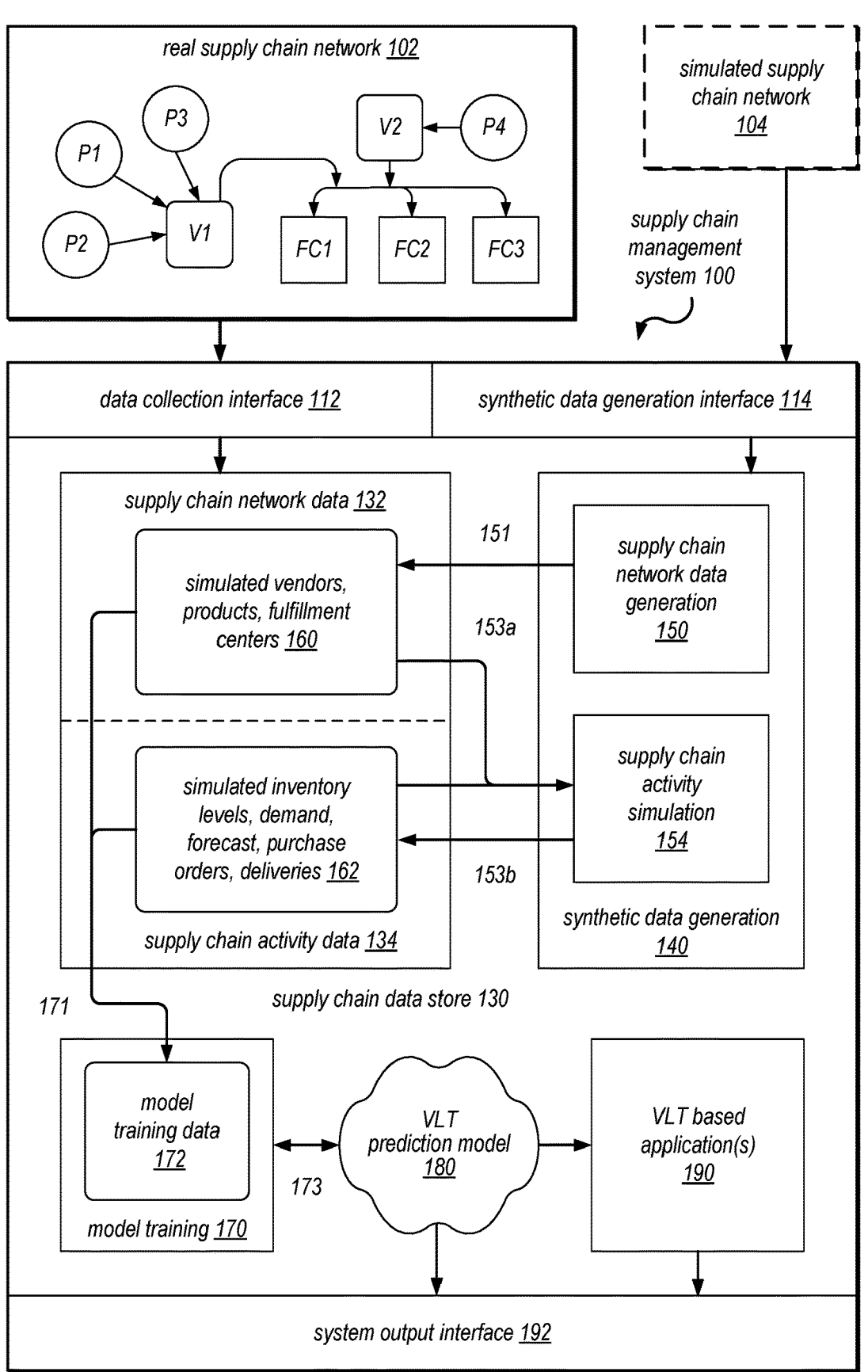
FIG. 1 illustrates an embodiment of a supply chain management system (SCMS) configured to generate synthetic supply chain data for training machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The present disclosure describes embodiments of a supply chain management system capable of generating synthetic supply chain data for training machine learning models used by the system.

Modern supply chain management systems (SCMSs) may be provided as a service to a large number of customer companies to manage the supply chain operations of the companies. In some embodiments, the supply chain management system is hosted in the cloud (e.g. managed by a cloud-based infrastructure service provider). The SCMS may use computing resources of the infrastructure service provider to maintain machine learning models for analyzing the customers' supply chains. For example, a machine learning model may be developed to predict the vendor lead time (VLT) of purchase orders, which measures the time between when a purchase order is placed with a vendor to when the purchased goods are available to the customer (e.g. stowed in a warehouse or available on the shelf). VLT predictions and other model-generated data may be used by a variety of services of the SCMS, for example, to provide analytic insights into the operations of the supply chain, monitor the supply chain for health risks (e.g. overstock and stock-out conditions), adjust operating parameters of the supply chain network (e.g. stock review schedules for vendors), and recommend or automate actions in the supply chain.

In some embodiments, the machine learning models used by the SCMS are developed using the customers' supply chain data, which may be transformed and loaded into a unified data model used by the system. All model training and validation in the SCMS are designed to operate on the unified data model.

However, the supply chain data needed to develop the machine learning models are not always available. For example, the customer may not have adequate data due to insufficient history or poor logging. As another example, the customer may not be able to provide such data because the data is business sensitive. This lack of supply chain data generally prevents many types of ML-based analytic tools from being used, and generally reduces the utility of the SCMS to the customer.

To overcome these challenges, embodiments of an SCMS are described herein to generate synthetic supply chain data for the customer, which can be used to develop machine learning models that are specific to the customer. In some embodiments, the synthetic data will be generated for the same unified data model used to house real supply chain data, so that the model training system will operate in the same way for both real data and synthetic data.

In some embodiments, the synthetic data generation process may be performed in multiple steps (e.g. for different groups of data entities in the data model), in an order that is automatically determined by the synthetic data generation system. Each step in the process may be performed by a scheduled job in an orchestrated workflow. In some embodiments, the data generation process is highly configurable by the user, where control parameters of each data generation job can be defined by the user via a user interface or specification language. In some embodiments, a synthetic data generation process can be configured to occur regularly or in response to certain events. In some embodiments, the generated synthetic supply chain data may be used to augment or complement the real data of a customer. The synthetic data may be used for model training purposes, or other types of applications such as simulation of scenarios on the supply chain network.

In some embodiments, the synthetic supply chain data generated by the system may include supply chain activity data that simulates the activities of the supply chain network over successive periods of time. The simulated activities may include depletion and replenishment of inventory for a particular product at a particular warehouse, and purchases from the vendor in response to the fluctuating inventory levels. In some embodiments, the synthetic data may also include supply chain network elements such as simulated fulfillment centers, vendors, and/or products. In some embodiments, the synthetic data generation process will generate synthetic purchase orders in individual time periods, and the fulfillment data (e.g. delivery or receipt times) of the purchases. The synthetic data will be generated by a stochastic process that is controlled by statistical parameters specified by users and calculated from other types of supply chain data. As a result, the generation process is able to produce highly realistic supply chain data that meets the various statistical requirements of the user.

In some embodiments, synthetic purchase orders generated by the SCMS are used as training data to train a VLT prediction model that predicts vendor lead times for purchase orders. The results generated by the VLT prediction model may be used by a variety of downstream tasks in the SCMS, such as insight extraction and visualization, supply chain monitoring, scenario simulation, and action recommendation or automation.

As will be appreciated by those skilled in the art, the features of the disclosed supply chain management system are designed to solve technical problems rooted in the computer field, including the efficient generation of high-quality data for machine learning applications executed on computer systems. The generation of large amounts of electronic supply chain data in accordance with statistical controls is not something that can be practically performed by a human using pen and paper, and the features described herein are not intended to capture any bare human mental and pen-and-paper processes, basic methods of organizing human activity, pure mathematical processes and formulas, and/or conventional business practices. These features and advantages of the supply chain management system are described in further detail below, in connection with the figures.

FIG. 1 illustrates an embodiment of a supply chain management system (SCMS) configured to generate synthetic supply chain data for training machine learning models, according to some embodiments.

As shown, the figure depicts a SCMS 100. Depending on the embodiment, SCMS implements a variety of supply chain management functionality for clients to management their supply chain networks, such as supply chain networks 102 and 104. As shown, a supply chain network 102 may include supply chain network elements such as vendors (V1, V2) that supply products (P1, P2, P3), and fulfillment centers (F1, F2, F3) that store the products once they have been received from the vendors. For example, supply chain network 102 may be the supply chain of a grocery store chain that stocks many different grocery products from many different product vendors. The fulfillment centers may include warehouse locations or retail locations.

As shown, SCMS may implement a supply chain data store 130 to store the supply chain data of many customers. The data in the supply chain data store 130 is used by the SCMS to perform a variety of data analytic tasks, such as supply chain network monitoring, simulating scenarios, or building machine learning models (e.g. vendor lead time (VLT) prediction model 180).

As shown, the supply chain data in the data store 130 may be populated in two ways. First, real supply chain data from a real supply chain network 102 may be collected or consumed via a data collection interface 112. This interface 112 will interact with the internal data stores of the customer and transform the customer's internal data to a suitable schema or format for the SCMS's supply chain data store 130. In some embodiments, the supply chain data of all customers will be transformed into the unified data model of the supply chain data store 130.

Second, the SCMS implements a synthetic data generation interface 114 that is able to receive configuration information pertaining to a simulated supply chain network 104. The SCMS implements a synthetic data generation subsystem or component 140 that is responsible for generating synthetic supply chain data according to the received configuration information. In some embodiments, the synthetic supply chain data may be generated for the same model that is used by real supply chain data (e.g. into the same data schema), so that downstream consumers of the supply chain data in the SCMS will treat synthetically generated data the same way as real supply chain data. The simulated supply chain network 104 may be a purely simulated supply chain network or a partially simulated supply chain network that has some real supply chain data. That is, the synthetic data generator 140 may be used to generate synthetic data to augment the data of a real supply chain network to, for example, add simulated network elements (e.g. real vendors, products, and fulfillment centers) or simulated supply chain activity data (e.g. product sales, purchases, and shipments).

As shown, in some embodiments, the supply chain data in the supply chain data store 130 may be divided into two types. The supply chain network data 132 includes data about non-transactional elements in the supply chain network, such as vendors, products, and fulfillment centers. The supply chain activity data 134 includes activity or transactional data in the supply chain, which can include data such as inventory levels, product demand, product forecast, purchase orders, and purchase order fulfillment. Unlike the supply chain network data 132, the supply chain activity data 134 may be time-based, where individual data items or records are associated with a time. In some embodiments, the data store 130 may be a database that models the supply chain data as entities (e.g. tables or structured datasets) with relationships. The two types of supply chain data shown here may be represented by two different sets of entities in the data store.

As shown, the synthetic data generator 140 may generate synthetic supply chain data in two separate stages. First, a supply chain network data generation component 150 is used to generate 151 synthetic supply chain network data, such as simulated vendors, products, and fulfillment centers 160. In some embodiments, this data 160 may be generated in a supervised manner (e.g. initially controlled by a user via a user interface). The instructions or results of this synthetic data generation step may be saved as a simulated scenario, so that the scenario can be easily recreated again.

Second, the synthetic data generator 140 in this example implements a supply chain activity simulation component 154, which is used to generate 153 synthetic supply chain activity data 162 such as simulated inventory levels, demands, forecasts, purchase orders, and product deliveries. As shown, the activity data may be generated 153b using 153a the synthetic supply chain network data 160 generated previously by the supply chain network data generator 150. In some embodiments, the supply chain activity simulator may read 153a from one set of entities in the supply chain data store 130 and write 153b another set of entities in the data store.

In some embodiments, the synthetic supply chain activity data generation may be performed in an unsupervised manner that is not closely monitored by a user. Rather, this step may be performed largely by programmed processes. In some embodiments, the synthetic supply chain activity data 162 may be generated according to a stochastic function defined by input function parameters. For example, the stochastic function may be used to constraint a particular generated variable to a particular distribution (e.g. mean and variance). The parameters of the stochastic function may be directly specified by the user or calculated (e.g. based on real supply chain activity data or previously simulated supply chain activity data).

In some embodiments, the synthetic data generator 140 may be configured to generate synthetic supply chain activity data 162 repeatedly, either based on a schedule or in response to particular events. For example, synthetic activity data may be generated whenever real activity data is received from a customer, so as to augment the received activity data. As another example, the synthetic activity data may be generated ahead of a detected risk in the supply chain network to simulate the realization of the risk.

In some embodiments, the synthetic data generator 140 may perform the synthetic data generation in accordance with control parameters. A set of control parameters for a full data generation process may be stored collectively as a repeatable scenario. In execution, the synthetic data generator 140 will launch data generation jobs according to the control parameters that correspond to individual entities in the data store that will be affected by the scenario. The synthetic data generator may implement an orchestrator that automatically determines the order in which the jobs are to be executed, and schedule the times for individual job executions. In some embodiments, the data generation jobs may log execution data into persistent logs, which may indicate information such as timestamps and statistics about the generated synthetic data, as well as any errors encountered during the generation process.

As shown, once the synthetic supply chain data is generated in the supply chain data store 130, the data may be further transformed 171 into model training data 172 to train machine learning models. This transformation step 171 may be performed by a model training component 170, which will select or calculate a set of data attributes from both the synthetic supply chain network data 160 and synthetic supply chain activity data 162 to construct data records in a training dataset or validation dataset for the ML model. As discussed, for customers who cannot provide sufficient supply chain data, the generation of synthetic supply chain data allows model training data 172 to be created to enable the development of the ML model. In some cases, the ML model may be initially trained using generated synthetic data, but validated internally by the customer using real supply chain data. The customer can then periodically provide model adjustment parameters or additional synthetic data generation parameters to the SCMS, in order to improve model performance over time.

As shown in this example, the ML model that is trained 173 using the synthetic supply chain data is a VLT prediction model 180 that predicts the vendor lead times for individual purchase orders or purchase order lines within a purchase order. Depending on the context, the VLT indicates the amount of time it takes for a product to be delivered by the vendor (or stocked for sale) after a purchase order for the product has been submitted. The training data 172 for the VLT prediction model 180 may include records corresponding individual purchase orders (PO) or purchase order lines, with a set of PO data attributes known at the time of the PO submission, and a labeled target attribute indicating the ultimate VLT of the PO. In some embodiments, the model training system 170 may be a specialized model training service external to the SCMS that is designed to specifically perform ML model training. The model training system 170 may be configured to store repeatable model training jobs, which can be executed to extract the necessary data attributes from the supply chain data store 130, transform the data into training datasets 172, and use the training dataset to train 173 the ML model until a desired model performance criteria is met.

As shown, after the VLT prediction model is sufficiently trained, its prediction output may be used by various downstream components of the SCMS. As one example, the predicted VLT values of individual purchase orders may be output via the system output interface 192, which may be an interactive user interface such as a graphical user interface (GUI) or a programmatic interface for other software components such as an application programming interface (API). In one example, the predicted VLT of a purchase order may be displayed on a user interface at the time that the PO is submitted. As another example, a predicted VLT for different vendors may be displayed by the SCMS on a map-based visualization of the supply chain network.

Additionally, in some embodiments, the VLT predicted by the VLT prediction model 180 may be used as input for various types of VLT-based applications 190. As one example, the predicted VLT for a particular product may trigger an alarm in a downstream analytic system to indicate that orders for that product should be placed immediately. As another example, predicted VLT values may be used by a downstream application to evaluate changes in the product ordering schedule so as to avoid stock out or overstock conditions.

Figure 2:
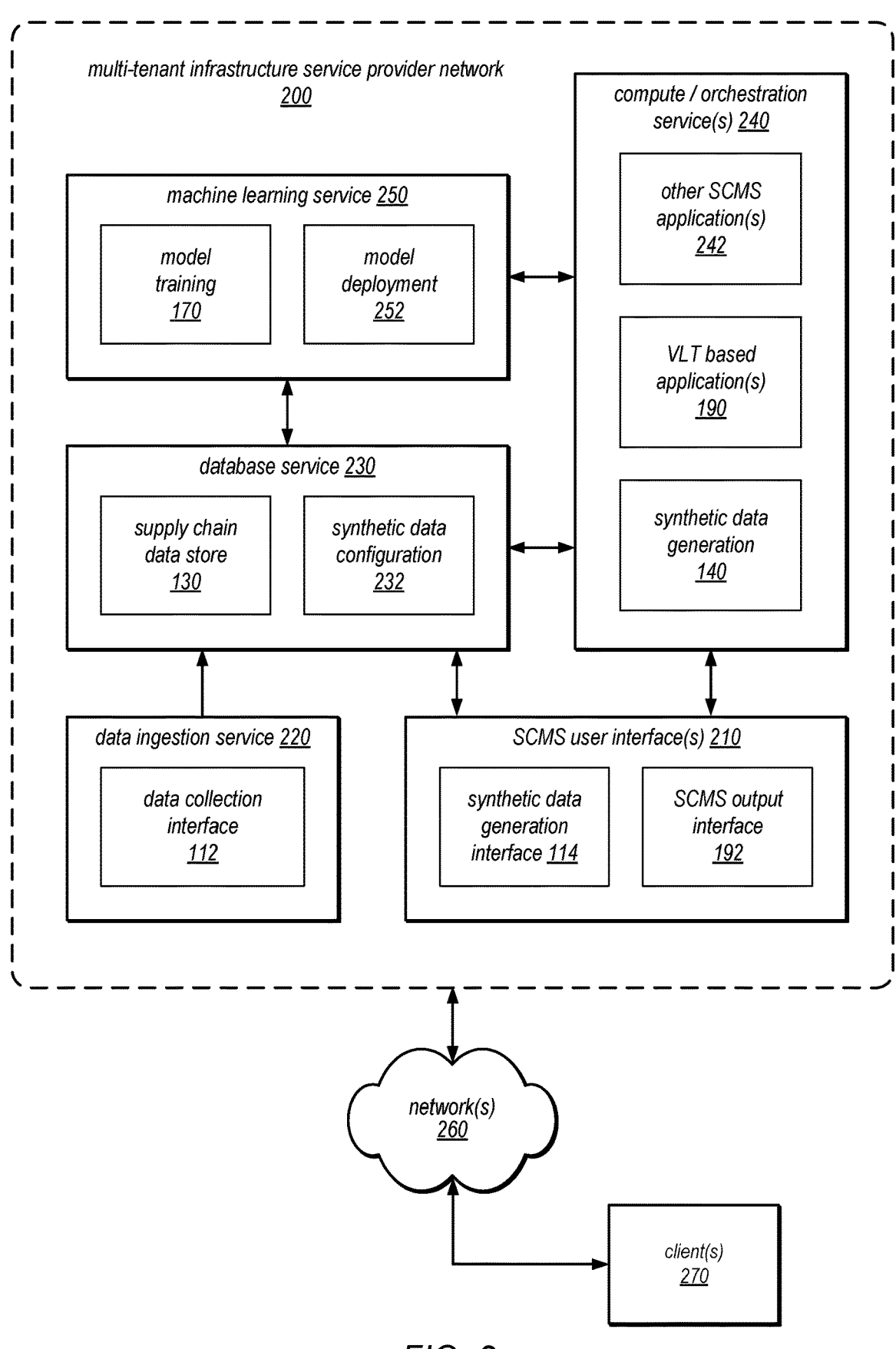
FIG. 2 illustrates an embodiment of the SCMS that is implemented in a multi-tenant infrastructure service provider network, according to some embodiments.

FIG. 2 illustrates an embodiment of the SCMS that is implemented in a multi-tenant infrastructure service provider network, according to some embodiments.

In some embodiments, the multi-tenant infrastructure service provider network 200 may be a private or closed system or may be set up by an entity such as a company or a public sector organization to provide one or more computing infrastructure services (such as various types of cloud-based storage) accessible via the Internet and/or other networks to clients 270 in client premises networks, in some embodiments. Service provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, resources, or services, such as a virtual private cloud (VPC) service, data ingestion services 220, database or data storage service(s) 230, compute or orchestration service(s) 240, data analytic service(s), machine learning service(s) 250, as well as other types of services such as auxiliary service(s) 280.

In various embodiments, the components illustrated in the figure may be implemented directly within computer hardware, as instructions directly or indirectly executable by computer hardware (e.g., a microprocessor or computer system), or using a combination of these techniques. For example, the components may be implemented by a system that includes a number of computing nodes (or simply, nodes), each of which may be similar to the computer system embodiment described below. In various embodiments, the functionality of a given system or service component may be implemented by a particular node or may be distributed across several nodes. In some embodiments, a given node may implement the functionality of more than one service system component (e.g., more than one data store component).

The compute service(s) implemented by infrastructure service provider network 200 offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A number of different types of computing devices may be used singly or in combination to implement the compute instances, containers, and/or functions of service provider network 200 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30% to 35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic location, etc. and (in the case of reserved compute instances, containers, and/or functions) reservation term length. In this example, compute instances provided by the service provider network 200 may be used to implement the synthetic data generation system 140, the VLT-based applications 190, as well as other types of SCMS applications that are not based on the VLT prediction model.

To implement the VPC service, the service provider network 200 provides a physical or substrate network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the service provider network, for example it may not be possible to route from a substrate network address to an address in a production network that runs services of the service provider, or to a customer network that hosts customer resources.

The VPC service may implement one or more client networks as overlay networks of virtualized computing resources (e.g., compute instances provided by the compute service(s), block store volumes, data objects such as snapshots and machine images, file storage, databases provided by the database or data storage service(s) 230) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, at least a subset of virtualization management tasks may be performed at one or more offload cards coupled to a host so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like. The offload card can function as a network interface card (NIC) of a host in some implementations, and can implement encapsulation protocols to route packets. In this example, the virtual network 154 of the SFG instance 150 may be provided and managed by the VPC service.

As shown, the service provider network 200 may implement one or more network-based database or data storage service(s) 230, configured to enable the SCMS 100 to store and retrieve data from one or more persistent or substantially persistent data sources. Illustratively, the network-based database or data storage services 230 may enable the SCMS 100 to retrieve a set of data to be analyzed, and store information (e.g., results) regarding that analysis. The network-based database or data storage services 230 may be, for example, a relational or non-relational database, or a data lake repository storing different types of structured and unstructured supply chain data. In another example, the network-based database or data storage services 230 may represent a network-attached storage (NAS), configured to provide access to data arranged as a file system. The network-based database or data storage services 230 may further enable the SCMS 100 to query for and retrieve information regarding data stored within the system, such as by querying for a number of relevant files or records, sizes of those files or records, file or record names, file or record creation times, etc. In some embodiments, the network-based database or data storage services 230 may provide additional functionality, such as the ability to separate data into logical groups (e.g., groups associated with individual accounts, etc.). As shown in this example, the database service 230 may be used to implement the supply chain data store 130 of FIG. 1, as well as a synthetic data configuration data store 232 to store configuration data or other metadata associated with the generation of synthetic supply chain data.

As shown, the service provider network 200 may implement a machine learning service 250 that is configured to perform a variety of machine learning tasks. The machine learning service 250 may be configured to build and host ML models, such as the VLT prediction model 180 of FIG. 1. Embodiments of the machine learning service 250 may provide functionality such as model training using different types of machine learning techniques, model validation, feature engineering, ML dataset labeling and management, model development environments such as notebooks and coding studios, model deployment, model execution and hosting, and model performance monitoring. In some embodiments, the model deployment component 252 may enable the VLT prediction model to be deployed to selected infrastructure provided by the service provider network, such as a managed fleet of VMs, software containers, or serverless instances.

As shown, the service provider network may implement one or more ingestion services 220, which are configured to ingest supply chain data into the SCMS 100. In some embodiments, the data ingestion service 200 may be implemented using an API gateway that is configured to receive regular uploads of supply chain data from client systems. In some embodiments, the data ingestion service 220 may implement a data stream consumption interface that is continuously receiving the supply chain data as a data stream (e.g. an event stream of activities in the customer supply chain network). In some embodiments, the data ingestion service 220 may use extract, transform, and load (ETL) tools provided by the service provider network to transform and load the received supply chain data into the supply chain data store 130. As shown in this example, the data collection interface 112 of FIG. 1 is implemented by the data ingestion service 220.

To enable user interactions with the SCMS 100, in some embodiments, the service provider network 200 includes one or more user interface(s) 210. In an illustrative embodiment, the user interfaces 210 serve as a "front door" to the other services, enabling users (via clients 270) to provide, request execution of, and view results of the SCMS. The user interfaces 210 include a variety of components to enable interaction between the SCMS 100 and other computing devices. For example, each user interface 210 may include an execution interface providing user computing devices with the ability to specify configuration for synthetic data generation and initiate a synthetic data generation process. Depending on the embodiment, the user interface communicates with external computing devices (e.g., client computing devices 270) via a graphical user interface (GUI), CLI, or API. The user interfaces 210 process client requests and makes sure that the requests are properly authorized. For example, the user interfaces 210 may control whether a user request to access a particular repository of supply chain data stored in the data store 130 is permitted. In this example, the user interfaces 210 is used to implement the synthetic data generation interface 114 of FIG. 1.

In some embodiments, the user interfaces 210 can further include an output interface configured to output information regarding a customer supply chain (e.g. the SCMS output interface 192 of FIG. 1). Illustratively, the output interface 192 may be used to provide a visualization (e.g. a map) of the supply chain network indicating the current state, recent activities, and health metrics of the supply chain network. As another example, the output interface may be used to generate alerts or alarms to users (e.g. via email, text, or social media messages) to indicate different types of real-time conditions in the supply chain network. As yet another example, in some embodiments, the output interface 192 may implement an API that automatically triggers actions by one or more external software components. Such actions may include automatic adjustments of supply chain operation parameters, or the initiation of a real-world action such as generation of a purchase order or an inventory rebalancing among warehouse facilities.

Generally speaking, the clients 270 may encompass any type of client configurable to submit network-based requests to service provider network 200 via network 260. For example, a given client device may include a suitable version of a web browser, or may include a plug-in module or other type of code module that may execute as an extension to or within an execution environment provided by a web browser. Alternatively, a client 270 may encompass an application (or user interface thereof), a media application, an office application or any other application that may make use of resources in in service provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, a client 270 may be an application that interacts directly with service provider network 200. In some embodiments, the client 270 may be a customer-specific supply chain management or inventory management system that is programmatically integrated with the SCMS 100.

As shown, the clients 270 can convey network-based services requests to and receive responses from service provider network 200 via one or more networks 260. In various embodiments, network(s) 260 may encompass any suitable combination of networking hardware and protocols necessary to establish network-based-based communications between clients 270 and service provider network 200. For example, network 260 may generally encompass the various telecommunications networks and service providers that collectively implement the Internet. Network(s) 260 may also include private networks such as local area networks (LANs) or wide area networks (WANs) as well as public or private wireless networks. For example, a given client 270 and service provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider network 200. It is noted that in some embodiments, clients 270 may communicate with service provider network 200 using a private network rather than the public Internet.

Example Architectural Components of Synthetic Supply Chain Data Generator System The following describes a component-level description over example embodiments of the synthetic data generator 140, which may be exposed as a service to implement a workflow for synthetic data generation. In some embodiments, the synthetic data generator 140 may be implemented in terms of architectural layers, which promotes sound design principles such as separation of concerns, decoupling of tasks, and flexibility. This layered architecture supports both programmatic and interactive synthetic data generation as a pipeline to ingest, store, process, catalog and publish. Depending on the embodiment, the system may be composed of the following layers:

Data generation layer-hosts generation core business logic.

Data storage layer-stores raw data, business data, and consumable data.

Data cataloging layer-enables data discoverability.

Data ingestion layer-ingests external and internal data.

Data publish layer-publishes the generated synthetic data.

Data governance layer-provides system level monitoring, security, privacy.

API interface layer-supports customer interaction.

The data generation layer is the core layer of the system for handling the synthetic data generation workflow and business logic, which comprises four major system components: scenario engine, entity generators, orchestrators, and scheduler.

The scenario engine component is implemented to handle the synthetic data generation job definition as a dynamic metadata configuration system. A scenario represents a customer use case that the synthetic data generated for, such as vendor lead time prediction, holiday peak simulation, etc. The system may allow the user to (1) define a new scenario, (2) reuse a pre-defined scenario, and (3) control the generation behavior of the scenario. In some embodiments, the scenario metadata describes (1) the list of entities in the data model to generate, (2) the corresponding entity generator component to use for each entity, and (3) input parameters for each entity generator.

The system generates the synthetic data against the unified data model of the supply chain data store 130. The scenario metadata content may be organized the same way as how the data model categorizes the data entities. In order to have better flexibility, the scenario metadata is designed as a freeform in each category, so that the user could be free to customize the synthetic data generation per the requirements.

The entity generators host the main generation computing workload in the system. While a scenario defines what to generate, an entity generator implements how to generate. One entity generator could be mapped to one or more data entities in the data model (e.g. fulfillment center entity or inventory entity), so as to provide more flexibility to customize the generation behavior. In some embodiments, entity generators could support inheritance to achieve reusability, for example to define variations on how data for a particular entity should be generated.

In some embodiments, the synthetic data generation process may be resource intensive. As an example, in one use case, six million records will be generated to cover 30 days outbound order line data for 5000 products stored in 40 sites. In order to better support horizontal scaling, the entity generators may be implemented so that they are decoupled between each other and can execute independently. However, some entity generators may still need to execute in a particular order to load the data generated from other entity generators as input. In some embodiments, the entity generators are implemented so that they (1) can execute independently in parallel, if possible, (2) execute in different runtime environments, and (3) be individually optimized through distributed computing platforms such as APACHE SPARK. This strategy combines the advantages of allowing customers to use different programming language ecosystems, such as Python for better ML support, Scala for better optimized big data processing performance, and R for better research support.

In some embodiments, the orchestrators implement workflow orchestration for the synthetic data generation process, which could be built by leveraging various orchestration services provided by the service provider network 200. In some embodiments, the orchestrator defines, manages and monitors the synthetic data generation workflow. For example, the orchestrator may be configured to (1) accept a generation job trigger event, (2) initialize the runtime environment for one or more entity generators. (3) ingest any existing data in the supply chain data store as necessary, (4) parse the generation process control input, (5) assemble the entity generators required for the scenario, (6) launch a generation job, and (7) monitor the execution status of the job.

In some embodiments, the orchestrator component may be configured to resolve the generation sequence for entities in the synthetic data generation process. The data generation process for different scenarios (e.g. to generate training data for a VLT model) generates data to an aggregated schema, although the data may be originally from a complex database. The synthetic data must be compatible with the unified data model used by the SCMS. Thus, the system must generate the data with proper relationships between each entity. The data relationship could be either expressly defined as part of the data model or implicitly defined by business logic. To satisfy these relationship and data model requirements, the orchestrator component may be implemented so that it (1) allows each entity generator to declare its own dependent entities, (2) builds a graph indicating the entity dependencies at runtime, and (3) uses a graph search such as Deep First Search (DFS) to resolve the generation sequence. Appendix B gives a visualized example of how the algorithm works.

Finally, the scheduler component implements the customer interaction interface of the generation layer (e.g. synthetic data generation interface 114). In some embodiments, the generation layer may be run in multiple different runtime environments, including local development, cloud development, and distributed cloud. The scheduler may be used to specify the execution time for a particular data generation job or provide downstream control of input and output of the generation job, so that a generation job could be easily scheduled for local debug, integration test, or production deployment.

In some embodiments, the data storage layer will be configured to handle data transition, caching, and intermediate/final result serialization in the synthetic data generation system. To store data based on its user scenario, the storage layer may organize the supply chain data store 130 into the multiple zones.

The Raw Zone is used for transient data that is ingested from sources as-is. For data augmentation or supervised data generation, the system may pull the existing data from data store 130 or accept raw data from the customer side as the system input. In some embodiments, the SCMS may interact with the raw data stored in this zone, for example, to prepare or transform the data for loading into the unified data model. The database or data storage services 230 of the service provider network 200 may be used to provide virtually unlimited scalability at low cost for this data zone.

The Business Zone may be designed for internal usage to store the data related to synthetic data generation process based on its own business logic. This zone hosts the database (e.g. supply chain data store 130) to track the lifecycle of all the scenarios and synthetic data generation jobs. In some embodiments, this data zone may also be used for shared data exchange and communication through one or more data storage services 230. As discussed, entity generators may be independently executed in runtime, but they still may depend on intermediate results data from each other as necessary input. Such intermediate results are not published to downstream consumers of the synthetic data, but will be available to the synthetic data generator itself from the business storage zone.

The Consumption Zone is the location where the last synthetic data generation results are stored. Before the synthetic data is published to the downstream clients for further consumption, it will be persisted into this zone. IN some embodiments, the data here may be cataloged, in formats that support performant and cost-effective access, and partitioned if necessary. Data cataloging may be built on top of the data in the consumption zone.

In some embodiments, the data cataloging layer is responsible for storing business and technical metadata about synthetic datasets hosted in the storage layer. The cataloging layer provides the ability to track the unified data schema as well as any other data schema if the data is in original format. In some embodiments, the generator system tracks the version evolution of the unified data model to guide the synthetic data's schema. For example, as the unified data model changes, the entity generation jobs may be automatically updated. In some embodiments, previously generated synthetic data may be automatically transformed to the new schema. Depending on the embodiment, the data cataloging layer will (1) integrate with database or data storage service (s) to fetch the latest schema from external data sources, (2) automatically convert the schema to the unified data model used by the SCMS, and (3) serialize the instantiated data models as data entities in the unified data model. In some embodiments, the data cataloging layer will provide functionality to make generated synthetic datasets more discoverable, query-able, and even searchable, as the synthetic datasets grow both vertically (more data) and horizontally (more entities).

In some embodiments, the data ingestion layer (e.g. data ingestion service 220) is responsible for bringing data into the Raw Zone in the supply chain data store 130. The ingestion layer may provide the functionality to connect to internal and any external data sources over a variety of protocols. Automated data ingestion pipelines may be used for use cases such as data augment, simulation, or incremental generation. In some embodiments, the data ingestion layer may also be used for use cases such as loading incomplete product information formatted as CSV file input to generate the whole product entity. The data ingestion layer can be built to support both batch and streaming data.

In some embodiments, the data publish layer implements functionality to publish the generated synthetic data to downstream consumption, such as the model training system 170. The data publish layer may be capable of publishing the synthetic data in both push and pull mode. In the push mode, once the new version of the synthetic data is generated, it will be pushed to a downstream data store through a data connector. Different types of subscriber channels, such as data streaming channels or data exchanges, can be supported as well. Subscriber channels may be used so that subscribing clients do not have to implement the unified data model in order to use the synthetic data. In the pull mode, the data publish layer may provide an API interface for accessing the generated synthetic data in the supply chain data store 130. The downstream clients can use the API to download portions of the synthetic data, or in some embodiments, view or control the execution of their synthetic data generation jobs.

In some embodiments, the governance layer implements functionality to protect the synthetic data in the storage layer and processing resources in all other layers. The governance layer provides mechanisms for monitoring the activities of all modules in other layers and generating a detailed audit trail of the system. In some embodiments, the governance layer also implements security controls within the synthetic data generation system, using techniques such as data encryption, network isolation among different customers, etc. The governance layer may also implement a policy system for enforcing synthetic data permission control, privacy protection, and access control globally under a multi-tenant context.

Finally, the API interface layer (e.g. the synthetic data generation interface 114) provides a series of APIs for customers to interact with synthetic data generation system. In some embodiments, the API interface layer will allow users to manage a synthetic data generation job's lifecycle to (1) schedule a job, (2) check the status of a running job, (3) update (e.g. pause, resume or stop) an existing job, and (4) retrieve execution results of a finished job. Additionally, the API interface layer may allow users to define and manage scenarios for synthetic data generation.

In some embodiments, user scenarios used for synthetic data generation may be versioned, for example, each change to the code of a particular entity generator job can be associated with a unique version number. The API interface layer may manage the versioning of the synthetic data generation job through the job's entire lifecycle. Depending on the embodiment, unique version numbers may assigned to (1) individual jobs, (2) each output of synthetic data, (3) each data generation context, including (a) runtime artifact identifiers associated with an job execution (e.g. an execution container tag), (b) corresponding code commit identifiers, (c) scenario metadata, and (d) the generation job input data.

In some embodiments, the synthetic data generation system will employ a multi-tenancy strategy to provide data security and isolation among different customers or tenants. In some embodiments, a hybrid tenancy model may be used that stores (1) raw customer data in the customer account in a single-tenant mode, and (3) synthetic data in shared accounts in a multi-tenant mode. Enforcement of multi-tenant security and isolation within the system may be implemented by the storage layer and the governance layer.

In some embodiments, internal and external customers of the system are treated the same by the system, and have the same lifecycle to schedule and manage synthetic data generation. Users may use the system to (1) create a data instance, (2) place necessary input or in the instance, and (3) schedule a synthetic data generation job on the instance. The synthetic data generated in the instance can then be published to other data stores.

In some embodiments, the unified data model will be an official data ingestion source to the synthetic data generation system. Support for the unified data model as a data source is required to support the ingestion of real customer supply chain data or previously generated synthetic data as input for use cases like data enhancement or incremental generation. In some embodiments, the system may allow internal users to consume synthetic data outside the unified data model context, such as for system development or agile model experiments by data science team. In some embodiments, the system may allow generated synthetic data to be used along with real data to run a certain experiment. In some embodiments, synthetic data may only be used under a simulation context, and will not be treated the same as real data.

To perform the simulation or experiment, (1) a simulation instance of the data is created for the simulation, (2) real customer data is replicated into the simulation instance, (3) synthetic data is ingested or generated into the simulation instance, (4) the simulation experiment will run based on the data in the simulation instance, and (5) multiple runs of a simulation experiment will reuse the same instance.

In some embodiments, the synthetic data generation system may allow users to specify data generation jobs in different programming languages. The data generate layer core may allow users to (1) use a variety of orchestration platforms and generation algorithms, (2) use distributed computing to optimize the heavy generation workloads, (3) run on cloud runtime environment to achieve easy horizontal scaling, and (4) leverage ML capability to support more comprehensive generation. In some embodiments, the system allows users to use (1) Python by default for quick jumpstart and experiments, (2) Java or Scala for distributed computing-based generation, and (3) R for ML-based generation. Embodiments of the system may provide a consistent coding experience for the API interface through HTTP. The API interface may allow for user management service provider network services used by the data generation system.

In some embodiments, the synthetic data generation system is built as an independently running service in the infrastructure service provider network, as opposed to a runtime loadable software library. The "data-as-a-service" approach provides a number of practical benefits for overcoming limitations of the library approach, including (1) repeated efforts to resolve the upstream/downstream dependencies (such as auto generate the data model from the unified data schema), (2) heavy resource consumption when generating big volume transactional data, and (3) lack of system level status tracking and error tracing. Additionally, the service-based approach provides better reusability and use experience, including (a) built-in integration with other infrastructure services, (3) on-demand computing/storage resource management for big data processing or AI based generation, and (4) system native security & governance support under multi-tenant context.

In some embodiments, the synthetic data generation system is built as part of a data pipeline, as opposed to a ML pipeline. A data pipeline refers to a data-centric workflow comprising one or more tasks that ingest, move, and transform raw data from a source to a destination. On the other hand, a ML pipeline is a means of automating the machine learning workflow by enabling data to be transformed and correlated into an ML model that can then be analyzed to achieve outputs. Both types of pipelines ingest data from the same operational data sources, transform it, and store it in a central data store. An ML pipeline includes specific steps to handle model training, while a data pipeline provides the publishing of ready-to-consume data. In this context, the data pipeline approach is the preferred approach for several reasons. First, a highly functional publisher layer is needed for this type of application, which can be used to serve synthetic data to a wide variety of data consumers in different roles. Second, the ML model may be used for data synthesis, but may not necessarily be delivered to the end users. Third, downstream consumers of the synthetic data can rely on features provided by the data cataloging layer to analyze and discover generated synthetic data. Fourth, the ML pipeline platforms typically do not allow great control over system behavior such as multi-tenant support and governance.

In some embodiments, the synthetic data generation system is built as a microservice as opposed to a monolithic or standalone application. A monolithic application is easy to develop, deploy, and maintain. However, it is more challenging for a monolithic application to scale horizontally, balance the workload, and switch to different technologies. The microservice application advantageously overcomes these disadvantages by allowing the application to adjust dynamically to runtime conditions during orchestration of component execution. Additionally, in a system that is architected as a data pipeline, it is very natural for individual stages in the data pipeline to be implemented as self-managing microservices. For example, as a microservice, the synthetic data generation system can (1) automatically schedule, organize, execute, and monitor data generation jobs, (2) extract existing or external data from multiple sources for hybrid data synthesis, (3) optimize performance by leveraging distributed computing frameworks such as APACHE SPARK, (4) generate ML based synthetic data, (5) monitor and trace the system runtime status globally, and perform a host of other microservice-enabled tasks.

In some embodiments, the synthetic data generation system employs a cell-based architecture to enable horizontal scaling of the system for more users or more workloads under the multi-tenant context. For example, different cells of resources can be used for internal user scenarios as opposed to generation workloads based on external customer data. The system can also be scaled in other ways.

In one respect, embodiments of the synthetic data generation system can be "scaled" to cope with changes in the underlying data model. As the unified data model for the supply chain data store evolves, the data generator system's two-level generator-orchestrator architecture provides great flexibility to keep up with model changes. In some embodiments, the orchestration layer does not need to be updated extensively, if at all, when the underlying data model changes. Rather, the system can be easily extended by introducing (1) new generators, (2) new generation algorithms, or (3) new orchestration to support customized data synthesis processes. The existing data generation logic could also be reused together with the newly introduced logic through either inheritance or composite programming patterns.

In another respect, embodiments of the synthetic data generation system can be "scaled" to support new data formats. In some embodiments, the unified data model used by the system is data format neutral, and can easily support new customer data schemas. The unified data model is designed to simplify integration with downstream and upstream services in the SCMS, as well as external systems. In some embodiments, the system uses data files structured in electronic data exchange (EDI) formats that can be easily changed based on the information they store. The number and/or sizes of the data files can also be dynamically changed by the system based on runtime conditions and/or system configuration. As a result, embodiments of the synthetic data generation system can be incrementally extended by implementing more generators to support new data formats.

In yet another respect, embodiments of the synthetic data generation system can be "scaled" to include additional types of execution environments. In some embodiments, the system is designed to handle enormous volumes of supply chain data. In one study involving generation of synthetic supply chain data for a grocery store operator to train a VLT prediction model, purchase order data was generated for 5000 products and 40 sites. A synthetic dataset for this scenario included over 84 million records for the outbound order entity. This required some portions of the generation process to be run in more powerful distributed computing environments, for example, APACHE SPARK clusters. The system may be configurable to allow more resource intensive portions of the process to be run in the distributed computing environment, and other portions to be run in less powerful environments.

Figure 3:
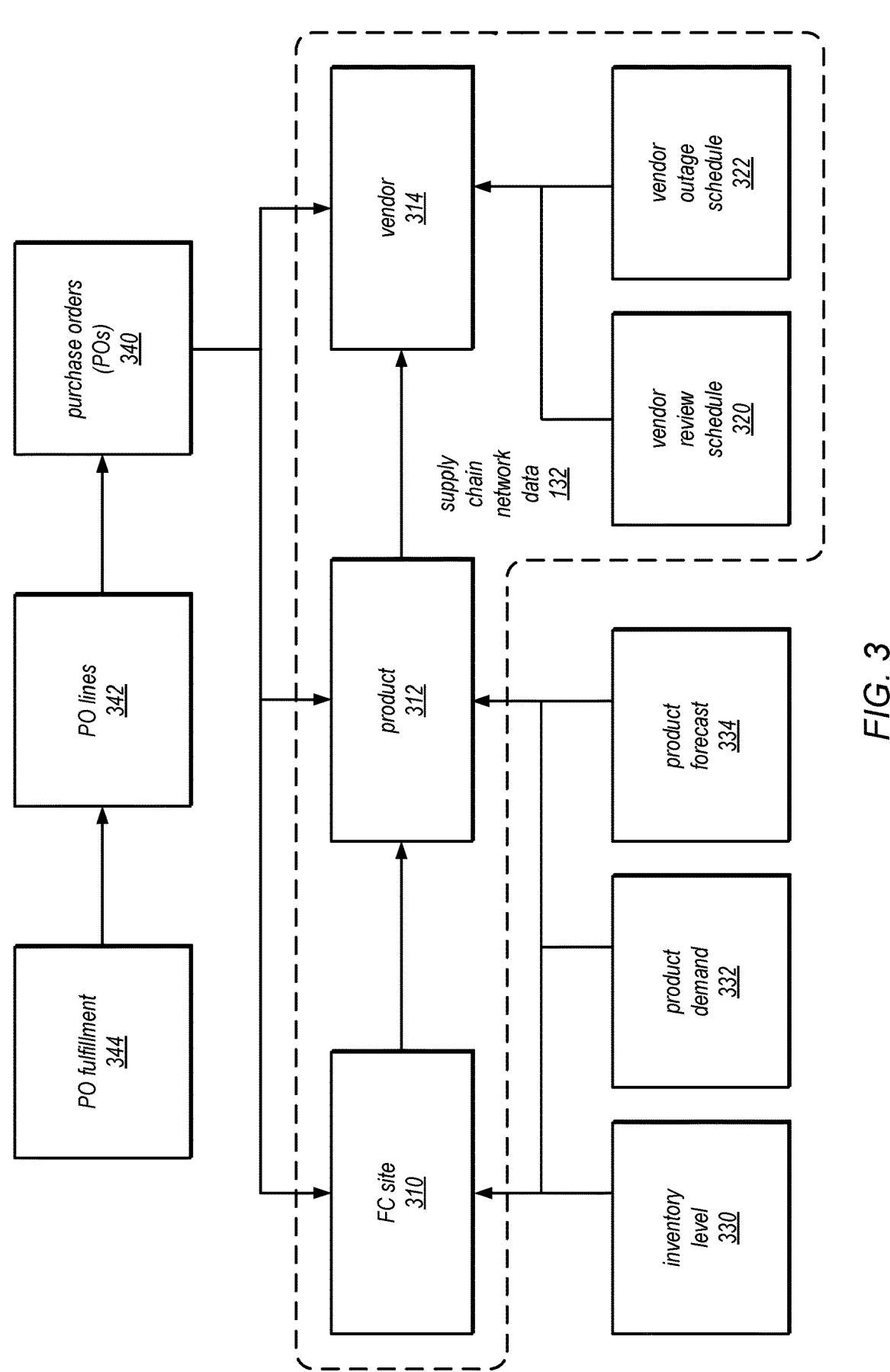
FIG. 3 illustrates an example data model used to generate synthetic supply chain data in the SCMS, according to some embodiments.

FIG. 3 illustrates an example data model used to generate synthetic supply chain data in the SCMS, according to some embodiments. The data model illustrated in the figure may be used as the unified data model for the supply chain data store in supply chain data store 134, as discussed in connection with FIG. 1.

In the supply chain data model depicted, each block represents an entity, and each arrow represents a parent-child relationship between the entities. The data model may be implemented in a type of data store that supports entity-relationship data models, such as a SQL database. In some embodiments, an entity may be stored as a formatted file, and the relationships may be implicitly enforced by the software reading and writing the files.

As shown, the data model includes a number of entities for storing the supply chain network element data 132. As discussed, these entities may be used to store data about relatively static elements in the supply chain network, such as fulfillment center (FC) sites 310, the products 312 stocked at each FC site, and the vendors 314 that provide each product. As shown, each vendor may have a separate vendor review schedule 320, which reflects when and how often inventory levels associated with a vendor are reviewed. In some embodiments, this schedule may be different for each FC site. As shown, each vendor may also have a vendor outage schedule 322, which represents times of vendor outage (e.g. certain holidays). As discussed, in some embodiments, the synthetic data generation system may generate simulated FC sites, vendors, products, or any associated data by writing to these entities.

In some embodiments, the entities outside the bubble 132 are considered supply chain activity data 134, which are relatively fast changing data that are associated with different time periods. As shown, the activity data includes entities such as inventory level 330, product demand 332 (e.g. how much inventory was depleted in the current period), and product forecast 334 (e.g. how much inventory depletion is expected in a future period). In this example, these entities are child entities of the FC site 310 and product 312 entities. Additionally, the activity data includes entities for purchase orders 340, purchase order lines 342 (e.g. individual products within a larger PO), and purchase order fulfillment 344 (e.g. data regarding subsequent handling, shipment, and delivery of product purchases). As discussed, in some embodiments, the synthetic data generation system may generate synthetic data for these entities, to simulate successive periods of inventory level fluctuations, vendor reviews, purchase order submissions, and fulfillment. In some embodiments, some of the entities in the data model are not part of the unified data model used to store real supply chain data, but used only by the synthetic data generation process. For example, in some embodiments, the inventory level 330, product demand 332, product forecast 334, vendor review schedule 320, and vendor outage schedule 322 are not official entities in the unified data model, and used to store intermediate data during synthetic data generation.

As discussed, in some embodiments, the synthetic data generation process will employ entity generators to generate synthetic data for individual entities in the data model, as specified by a scenario configuration. The order in which each entity is populated may be automatically determined by the system based on the relationships in the data model. The generation process may both read from and write to the data model. Ultimately, some of the generated data may be used for model training. For example, to train the VLT prediction model, data in the purchase order-related entities 340, 342, and 344 may be used as training data.

The table below provides a listing of entities and attributes that were included in an embodiment of the unified data model. The data model also includes a statistics entity that was used to track various types of statistics calculated from the supply chain data.

| Entity/Attribute | Description |
| --- | --- |
| Warehouse | |
| region_id | geographical region |
| warehouse_id | warehouse ID |
| Vendor | |
| distributor_id | value assigned to a distributor/vendor to uniquely identify them |
| vendor_name | name of the vendor |
| business_group | a vendor may be associated with a business group. |
| vendor_type | e.g. wholesaler, manufacturer, retailer |
| program | a regrouping of business groups |
| preferred_order_method | e.g., fax, phone, email |
| Product | |
| product_id | unique product identifier |
| product_category | product category, subcategory, or segment |
| temp_zone | e.g., ambient, chilled, frozen |
| sort_type | e.g., sortable, fullcase, noncon |
| pkg_cubic_inches | volume of the package in cubic inches |
| pkg_weight | weight of the package |
| submitted_cost | cost of the product submitted in the PO |
| fc_shelflife | shelf-life of the product |
| Purchase Order | |
| order_id | identifier assigned to a purchase order to uniquely identify it |
| supplier_order_type_id | order types group together purchase orders which are a specific "type" |
| po_condition | value indicating the point of the PO lifecycle— e.g., submitted, confirmed, complete |
| latest_ack_code | latest acknowledgement code |
| order_datetime | the date / time in which the order was placed |
| day_of_the_week | weekday of the order submission |
| confirmation_datetime | datetime of confirmation |
| cancellation_datetime | datetime of cancellation |
| expected_delivery_dt_original | the original (at PO creation time) expected delivery date of this line item, determined by purchaser system |
| expected_delivery_datetime | the date that purchaser expects the item to be delivered to an FC, determined by purchaser system |

-continued

| Entity/Attribute | Description |
|---|---|
| expected_delivery_dt_source | a line-item level date supplied on a purchase request that expresses the date on which the purchaser expects an item to be received into an FC |
| received_datetime | datetime when the shipment was received from vendor |
| shipment_payer | value indicating whether the vendor or the purchaser pays for shipping |
| ship_date_source_type | the source of the ship or delivery window information below |
| earliest_vendor_ship_datetime | if the purchaser is paying for shipping, the beginning of the ship window |
| latest_vendor_ship_datetime | if the purchaser is paying for shipping, the end of the ship window |
| earliest_vendor_delivery_date | if the vendor is paying for shipping, the beginning of the delivery window |
| latest_vendor_delivery_date | if the vendor is paying for shipping, the end of the delivery window |
| submission_to_earliest_vendor_delivery | earliest_vendor_delivery_date minus order_datetime |
| submission_to_latest_vendor_delivery | latest_vendor_delivery_date minus order_datetime |
| Purchase Order Line | |
| quantity_submitted | initial quantity submitted to the vendor |
| quantity_confirmed | quantity the vendor agreed to send |
| quantity_cancelled | cancelled quantity |
| quantity_received | quantity received |
| Statistical Data | |
| last_product_vlt | last VLT for Warehouse/Vendor/Product |
| second_to_last_product_vlt | second to latest VLT for Warehouse/Vendor/Product |
| last_vendor_vlt | last VLT for Warehouse/Vendor |
| second_to_last_vendor_vlt | second to latest VLT for Warehouse/Vendor |
| last_month_prod_nb_po | number of POs submitted for the product by the warehouse to the vendor in the previous month |
| last_month_prod_quantity_submitted | quantity ordered of product by the warehouse from the vendor in the previous month |
| last_month_prod_avg_vlt | average VLT over the previous month for Warehouse/Vendor/Product |
| last_month_vendor_nb_po | number of PO submitted by the warehouse to the vendor in the previous month |
| last_month_vendor_nb_prods | number of products ordered from the vendor by the warehouse in the previous month |
| last_month_vendor_quantity_submitted | total quantity submitted by the warehouse to the vendor in the previous month |
| last_month_vendor_avg_vlt | last month average VLT across all products between the vendor and the warehouse |
| vlt | received_datetime minus order_datetime in number of days |

Figure 4:
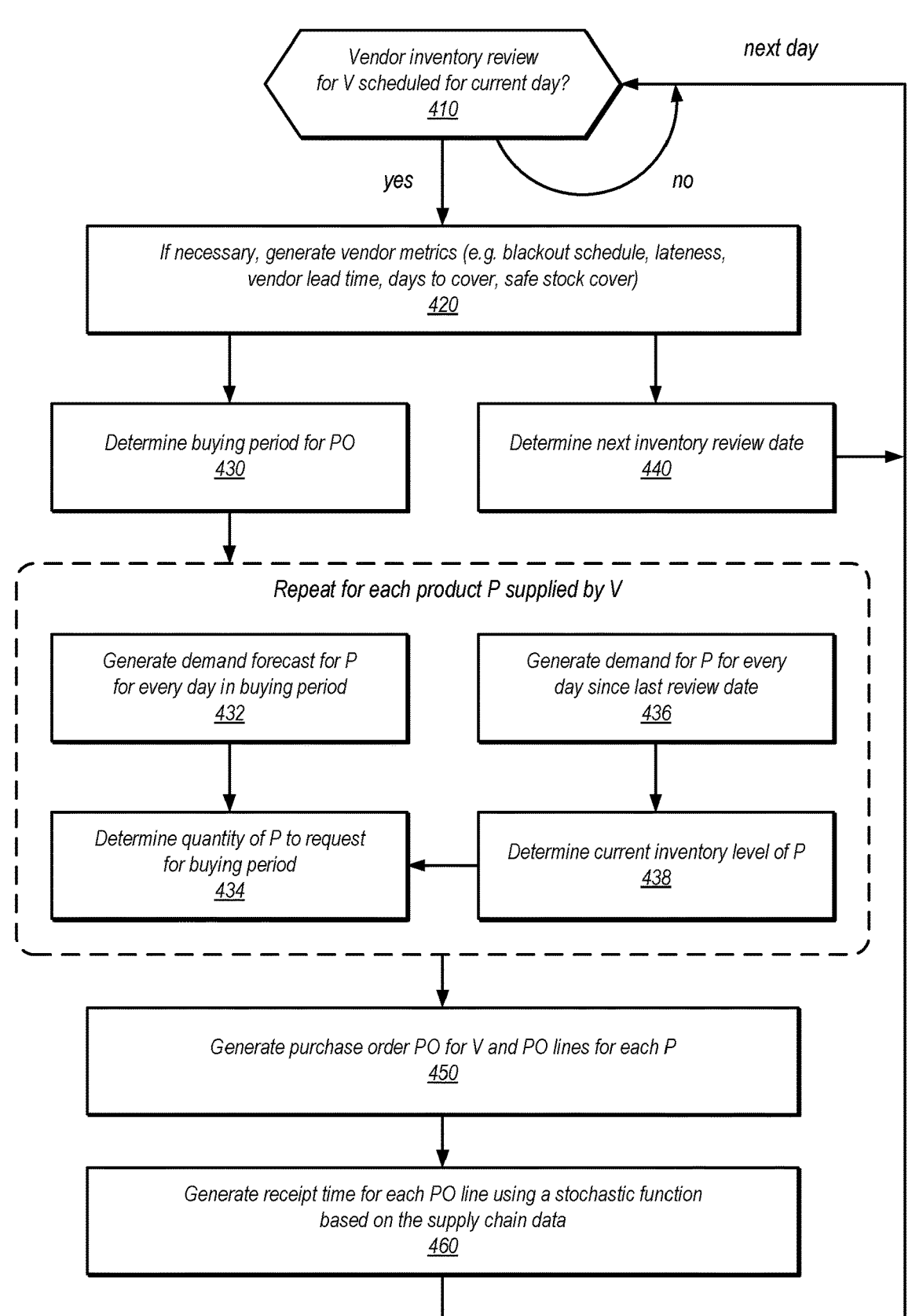
FIG. 4 illustrates an example synthetic data generation process implemented by the SCMS, according to some embodiments.

FIG. 4 illustrates an example synthetic data generation process implemented by the SCMS, according to some embodiments. The depicted generation process may be performed by an embodiment of the SCMS 100 of FIG. 1.

As shown, the synthetic data generation process simulates the activities of a particular warehouse or fulfillment center over successive days, based on simulated inventory levels associated with a particular vendor. This process may be repeated for multiple fulfillment centers, multiple vendors, and multiple scenarios as desired.

At operation 410, the process determines whether a vendor inventory review for vendor V is scheduled for the current day. If so, the process will potentially generate a synthetic purchase order PO from the fulfillment center FC to V. Operation 410 may be determined based on a schedule as specified in the vendor review schedule 320. The vendor review schedule may indicate the review days when the customer's procurement software or stock manager re-evaluates the inventory level and decide if a replenish-ment PO needs to be placed for the vendor. In some embodiments, POs for the vendor will only be placed on the review days. The review schedule may be generated as a fixed schedule or adjusted dynamically during the generation process, based on configuration information or simulated conditions in the supply chain. For example, as shown, operation 440 may be performed to schedule a next inventory review date in the review schedule.

At operation 420, vendor metrics are generated for V if necessary (e.g. if these metrics do not exist). In some embodiments, operation 420 may be performed as part of a user-supervised process where the metrics are generated based on user-specified parameters. Vendors metrics that may be generated at this stage include a blackout schedule of the vendor, a lateness metric of the vendor, a VLT metric of the vendor based on historical data, days to cover associated with the vendor, a days to cover safe stock for the vendor, among other types of data. These generated vendor metrics may be used as input parameters to subsequent generation of time-based activity data in the supply chain. In some embodiments, a similar process may be used to generate a simulated fulfillment center or simulated product, according to user specifications.

At operation 430, a buying period for the PO is determined, which may indicate the length of time, in days, that the PO is intended to cover. The buying period may be determined based on configuration parameters, and in some embodiments, other synthetic supply chain data. For example, the buying period may be determined based on the vendor metrics of V determined at operation 420, which may themselves be dynamically changing over time. As one example, if V is expected to enter a blackout period or has been slow to fulfill orders recently, the buying period may be increased.

As shown, operations 432, 434, 436, and 438 are repeated for every product P supplied by V. At operation 432, a demand forecast is generated for product P for every day in the buying period. If not explicitly provided, the forecast will be generated as a random value per product/site/day, based on a normal distribution of the demand for the product P and the site FC. In some embodiments, the distribution will factor in the product's popularity and sale velocity into the parameters of the normal distribution. For example, food and consumables will have different demand distributions than slower products such as laptops. This simulated forecast will be used as a component to determine the quantity of P to request in the PO, at operation 434.

Operations 436 and 438 simulates inventory depletion of P since the last vendor inventory review date. As shown, operation 436 generates the daily demand of P for every day since the last vendor inventory review date. This simulation may be performed in a similar manner as discussed for operation 432. Operation 438 will determine a current inventory level of P at FC, based on the daily demand of P determined by operation 436.

Operation 434 then combines the results of operation 432 and 438 to determine the quantity of P to be requested in the PO. In some embodiments, the PO submitted quantity will be calculated with the aggregated demand forecasts for the days covered by the PO minus existing inventory. For example, submitted quantity=Σdemand−existing inventory. The calculation may use a pre-defined Day of Cover (DOC) per vendor, and the time period that the PO will cover starts from submitted date+VLT until submitted date+VLT+DoC. DoC and VLT may be randomized to the same value.

In some embodiments, the beginning inventory level of the first simulation day will be randomly selected per site/product. The process will calculate end inventory level for each day by adding the incoming inventory and deducting the inventory drainage (outbound orders). The end inventory level for day T will be used for the beginning inventory for day T+1.

Once the requested quantities for all products are determined, the process proceeds to operation 450, the PO to V is generated. In some embodiments, the PO may be separated into PO lines, where each PO line corresponds to one product. Thus, the process generates a time series of synthetic purchases orders, where each purchase order includes the submitted date, estimated delivery window (earliest/latest ship date). The submitted date is determined according to the vendor review schedule, depending on whether the product requires a replenishment, a purchase order may be generated on the review day of the vendor.

At operation 460, a receipt time (e.g. a simulated receive data for a purchase order line) is generated using a stochastic function based on other supply chain data. In some embodiments, The simulated receive date will be the submitted date plus a lead time, which will be randomly selected from a Gamma distribution. Although normal distribution is often used for lead time randomization, Gamma distribution typically represents stochastic lead time better. In some embodiments, the mean of the Gamma distribution will be a pre-defined value per vendor. In some embodiment, the distribution may factor in the features of the vendor and the fulfillment center's geographical location. In some embodiments, if the receive date lands on the vendor's outage day, the date will be shifted to the next day the vendor operates. The earliest/latest ship date will deviate from the actual received date by a randomly selected value. In some embodiments, other types of stochastic data generation techniques may be used, for example, using generative adversarial networks (GANs).

The following pseudocode describes another variation of the supply chain data generation process. This process may be initiated on a regular (scheduled) basis or triggered on demand.

```
For each site FC in the supply chain network:
    Generate site data if not existing, including inbound
        pad time
    For each vendor V of the FC:
        Generate vendor data if not existing, including ven-
            dor outage, days of cover, and VLT
        If V is scheduled for inventory review:
            For each product P of V at FC:
                Determine a buying period for V
                For each day of buying period:
                Generate forecasted demand for P
                For each day since last inventory review:
                Generate demand for P and inventory level
                Determine quantity of P to request based on
                    inventory level and forecasted demand
                Generate a purchase order PO for V and PO
                    lines
                Generate receipt times of PO lines based on
                    configured stochastic function
                Determine a next inventory review date for V
```

As shown, the process will generate data for simulated FCs and Vs as necessary, using heuristics (e.g. demand forecast, vendor review schedules). The supply chain activity data (e.g. purchase orders, purchase order lines) will be generated as the program simulates the inventory depletion and replenishment. The process will iterate over sites, days of the period, and products and for each site/date/vendor to determine if a purchase order line needs to be created and if so, the time series of submitted dates, estimated delivery dates, received dates, and the quantity of units. For generation of training data for the VLT prediction model, the purchase order and purchase order line data will be the main output of the process.

FIG. 5 illustrates an example training process for training a vendor lead time (VLT) prediction model based on synthetic supply chain data generated by the SCMS, according to some embodiments. As shown, the depicted process may be used to train the VLT prediction model 180 of FIG. 1.

As shown, the model 180 is trained using a training dataset of training records 510. As discussed, these training records may be derived from synthetic supply chain data generated by the synthetic data generator 140, including synthetic purchase orders and purchase order lines. The attributes in the training data record 510 may include a mix of real supply chain data synthetic data, the latter of which may include statistical data calculated from other data. In some embodiments, the attributes are selected from a universe of all data attributes in the unified data model, and selected based on a feature importance analysis. As shown, in the depicted example, the training data attributes include a VLT metric calculated over previous order periods, the number of purchase orders for a product over previous order periods, the quantity of a product requested in previous order periods, the product category of P. and the weekday when a purchase order is submitted.

In general, each training record 510 may include a set of features about the purchase order, the product, the vendor, and historical features about different combinations of the product, vendor, and fulfillment center. Formally, the VLT model 180 may be expressed as the function $f$:

$$vlt_{q,a,v,w,t} = f(O_{q,a,v,w,t}, Y_a, X_v, I_{a,v,w,t}, J_{v,w,t})$$

where $O_{q,a,v,w,t}$ is a vector containing purchase order-related features of a purchase order submitted at time t for a quantity q of a product a supplied by vendor v to be delivered to warehouse w; $Y_a$ is a vector containing characteristics of the product such as product categorization, weight, dimensions, etc.; $X_v$ is a vector containing information about the vendor; $I_{a,v,w,t}$ is a representation of historical data at time t associated with the combination of (product a, vendor v, and warehouse w); and $J_{v,w,t}$ is a representation of historical data at time t associated with the combination of (v and w). It is noted that all input features to the model are features that are observable at the time that the purchase order is submitted.

As shown, the training data record 510 also includes a VLT attribute, which is the target variable to be predicted by the model and the truth label of the record. The VLT for the purchase order record may be calculated as the time lapse between the receipt time minus the submit time.

In some embodiments, the VLT prediction model may be a quantile regression model that is trained to output VLT values 540 for different quantiles of a probability distribution curve. For example, the model 180 may output an upper bound and a lower bound for the VLT value, where the actual VLT value is expected to be between the two bounds with 90% confidence. Such a model 180 may include multiple regressors 530 that are trained to produce the value for each quantile. The training system 170 may use one or more quantile loss functions 520 that specify different penalties for each quantile.

A quantile regression model models a probability distribution of the output variable (e.g. the VLT value). For example, if the $n^{th}$ quantile of the distribution is $q_n$ then there is an n % confidence that the true value of VLT will be less or equal to $q_n$. The intuition is that the higher the quantile, the higher should be quantile prediction. So for VLT, the higher the quantile the more pessimistic the prediction is and vice-versa.

In the quantile regression paradigm, the predicted value is viewed as a realization of a random variable that follows the distribution and the model tries to predict the different quantiles of that distribution. For example, an accurate $90^{th}$ quantile model will produce predictions at 90% probability that are less or equal to the true value. In some embodiments, the model 180 will produce values for several different quantiles (e.g. at 0, 0.25, 0.5, 0.75, 0.9, and 1), and the training process will train several different models, each specialized in predicting one quantile.

In some embodiments, the quantile loss 520 is used to train and evaluate the performance of quantile regression models. The quantile loss function may assign different penalties for different quantiles. In some embodiments, the penalty may be proportional to the quantile used, and can be used to produce opposite effects for upper bounds versus lower bounds. When training the model 180, the model trainer 170 will strive to reduce the quantile loss as much as possible. Therefore, a good quantile regression model will have a small quantile loss for each of the quantiles.

The model trainer 170 may be specially adapted to train one of a variety of model types, including Regularized Linear Regression (ElasticNet), RandomForestRegressor, GradientBoostingRegressor, XGBRegressor, KNeighbors-Regressor (KNN), LGBMRegressor (LightGBM) and Feed Forward Neural Networks (FFNN). In one embodiment, the LGBMRegressor (a gradient boosting decision tree model) was selected because the training system for that model offered the possibility to use quantile loss for training as a built-in-function. A quantile loss score for cross-validation may be implemented using GridSearchCV. In one embodiment, a VLT prediction model 180 trained using these techniques and a small set of features derived from synthetically generated supply chain data, as discussed above, achieved 25%+improvement in prediction accuracy over previous models.

Figure 6:
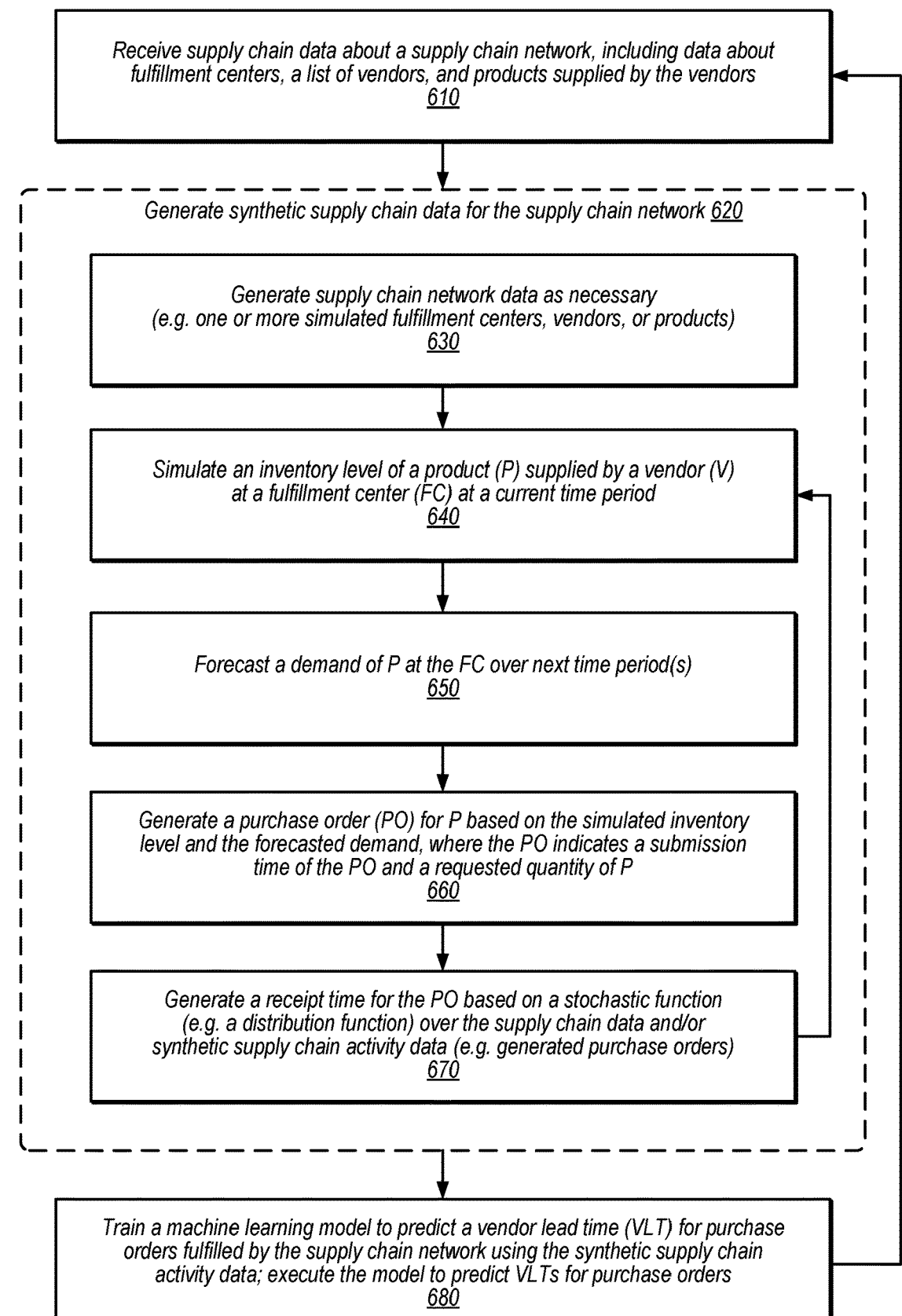
FIG. 6 illustrates an example process performed by the SCMS to generate synthetic supply chain data for training a VLT prediction model, according to some embodiments.

FIG. 6 illustrates an example process performed by the SCMS to generate synthetic supply chain data for training a VLT prediction model, according to some embodiments. The depicted process may be performed by an embodiment of the SCMS 100 of FIG. 1, and the data received and generated by the system may be stored in the supply chain data store 130 of FIG. 1.

The process begins at operation 610, where supply chain data about a supply chain network is received. The supply chain data pertain to a real supply chain network 102 or a synthetic supply chain network 104, which may be previously generated by the SCMS. The supply chain data may include data about network elements such as fulfillment centers, vendors, and products in the supply chain network. In some embodiments, the supply chain data may also include some amount of supply chain activity data, which may pertain to actual activities or synthetic activities simulated by the SCMS. In some embodiments, the supply chain data may include user-specified configuration data for generating synthetic supply chain data, such as a stochastic function for generating a particular attribute or parameters of a distribution for a particular attribute. The supply chain data may be received via a data collection interface 112 or a synthetic data generation interface 114, as discussed.

As shown, operations 630 to 670 are part of a synthetic supply chain data generation process 620, which may be implemented by an embodiment of the synthetic data generation system 140 of FIG. 1. At operation 630, the system generates supply chain network data (e.g. synthetic supply chain network data 160), as necessary. This data may include simulated elements such as simulated fulfillment centers, vendors, or products that are not time-based. Such elements may be generated based on actual supply chain data or based on user specifications.

At operation 640, the system simulates an inventory level of a product P supplied by a vendor V at a fulfillment center FC, for a current simulated time period. As shown, the process may repeatedly generate synthetic supply chain activity data for successive periods (e.g. successive days) based on a simulated vendor review schedule, as discussed in connection with FIG. 4. As discussed, the inventory level may be determined based on an existing inventory level of the previous period (e.g. prior to a last vendor inventory review), and an inventory depletion since the last review based on simulated demand.

At operation 650, the system forecasts a demand of P at the FC over next simulated time period(s). The next simulated periods may be days in a buying period determined based on certain properties of the vendor V, as discussed in connection with FIG. 4.

At operation 660, a purchase order PO is generated for P based on the simulated inventory level and the forecasted demand. For example, the PO will be generated to request a quantity of P that both replenishes the inventory from depletion during the current period and pad the inventory for expected demand in the next period. The PO will also include a simulated submission time, which indicates the time (e.g. the day of week) that the PO was submitted. In some embodiments, the process may be vendor inventory review may review in the inventory for all products associated with V, and the PO will include multiple lines for each of the products and their requested quantities.

At operation 670, the system generates a receipt time for the PO (e.g. each PO line) based on a stochastic function. In some embodiments, the stochastic function may be generated based on a desired distribution (e.g. Gamma distribution of VLT metric) specified by the user. In some embodiments, the distribution may be defined for different domain areas of the supply chain data or supply chain activity data. For example, an individual distribution may be used for an individual combination of fulfillment center, vendor, product category, and day of week. As shown, the process is repeated over a number of simulated time periods to generate a time series of purchase orders with simulated submission and receipt times. In some embodiments, the generation process 620 may be repeated for every fulfillment center, every vendor, and every product in the supply chain network.

At operation 680, a machine learning model is trained for predicting a VLT for purchase orders (e.g. VLT prediction model 180). The training is performed using training data (e.g. training data 172) derived from the synthetic supply chain activity data (e.g. the generated purchases orders and the submission and receipt times of the orders), and may also include other non-activity data or real data that was not generated. In some embodiments, some of the features included in the training dataset may be statistical attributes calculated from the purchase order time series. In some embodiments, the training features of the model may be selected by a feature importance analyzer. The training features may include some of the features shown for training record 510 in FIG. 1. In some embodiments, the compilation of the training dataset may be performed by the model training system (e.g. model training system 170), and the training dataset may be split into training and validation sets for different stages of the training process. In some embodiments, as discussed in connection with FIG. 5, the VLT prediction model may be a quantile regression model that outputs VLT values for different prediction quantiles associated with different confidence levels. The model may include different regressors for each quantile, which are trained based on quantile loss function(s) that treat each quantile differently during training. As shown, once trained, the model may be deployed and executed to make VLT predictions for purchase orders.

Figure 7:
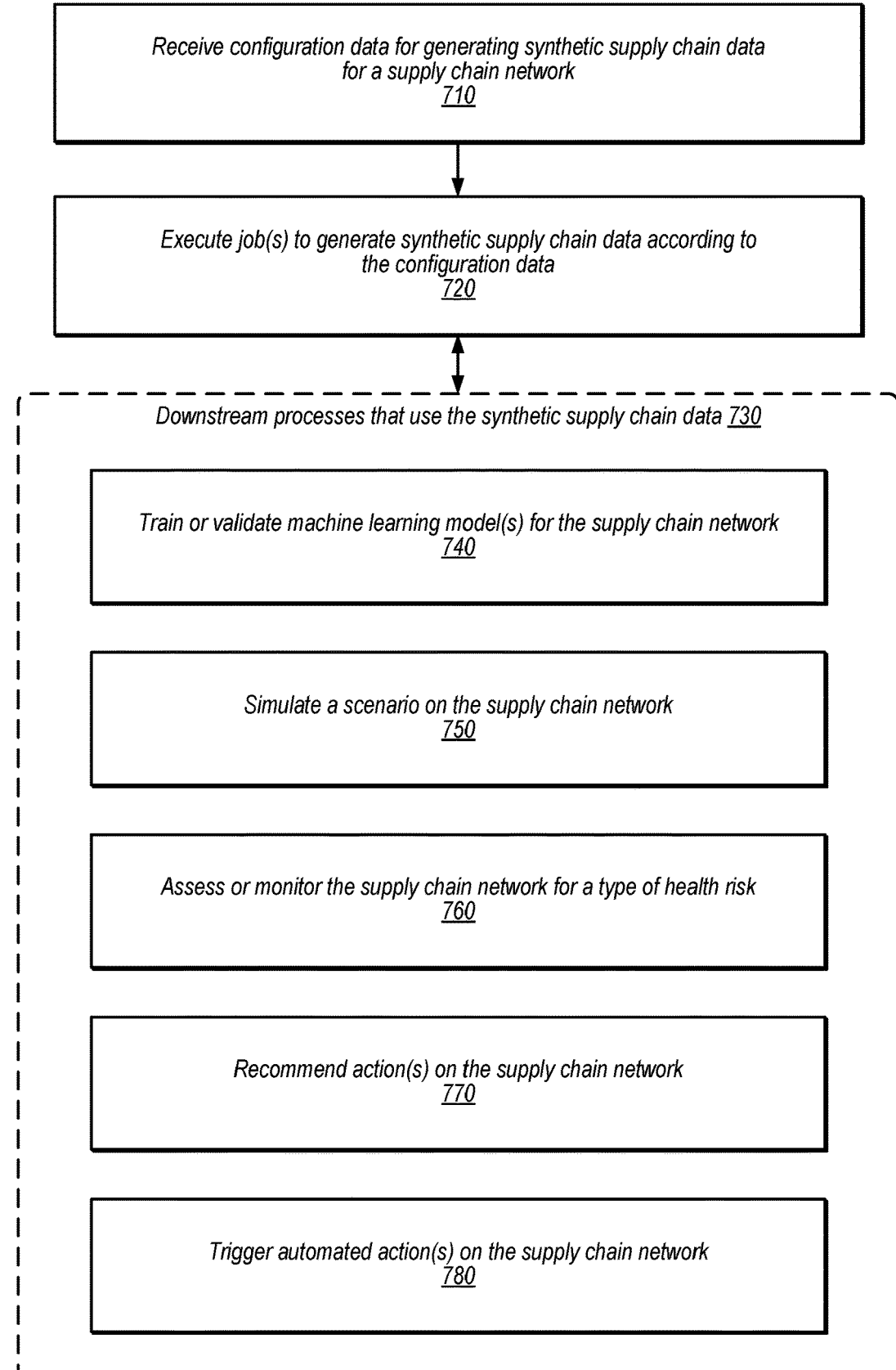
FIG. 7 illustrates an example process performed by the SCMS to use generated synthetic supply chain data for a variety of downstream tasks, according to some embodiments.

FIG. 7 illustrates an example process performed by the SCMS to use generated synthetic supply chain data for a variety of downstream tasks, according to some embodiments. The depicted process may be performed by an embodiment of the SCMS 100 of FIG. 1.

At operation 710, the system receives configuration data for generation of synthetic supply chain data for a supply chain network. The configuration data may be received via a configuration interface of the system, such as synthetic data generation interface 114 of FIG. 1. The configuration interface may be an interactive interface such as a GUI or a web-based console, or a programmatic interface such as an API or a web service interface. In some embodiments, the configuration data may be specified in a specification language, which will include instructions on how elements of the synthetic data should be generated (e.g. statistical constraints). In some embodiments, the configuration data may include generator code in a programming language, which can be used to specify specialized data generation algorithms and reused. In some embodiments, the configuration data may define the data generation as part of a scenario that can be saved and repeated. The configuration data may be stored in a synthetic data configuration repository 232, as discussed in connection with FIG. 2.

At operation 720, the system executes jobs to generate synthetic supply chain data according to the configuration data. In some embodiments, the behavior of the jobs themselves may be defined in the synthetic data. Each job may be specified to generate data for a particular set of entities in the data model. In some embodiments, the generation system may implement an orchestration system that controls the order that the jobs are executed, depending on entity relationships in the data model, and also the scheduling of jobs, which may depend on events in the system or real-time resource usage levels. In some embodiments, each data generation process will generate synthetic supply chain data into a new data store instance, which will be kept private to the owner of the job by default. In some embodiments, the supply chain data store instance may be made available to downstream processes 730 for consumption by updating the permissions of the data store.

The downstream processes 730 that use the synthetic data may include a variety of processes implemented by subsystems within the SCMS 100, including the model training system 170, VLT-based applications 190, and other SCMS applications 242. As shown in this example, such processes may include processes 740 to train or validate ML models for the supply chain network (such as demand forecasting models), processes 750 to simulate a scenario on the supply chain network (e.g. the introduction of a new vendor or product), processes 760 to access or monitor the supply chain for a type of health risk (e.g. to generate alerts for overstock or stock out conditions), processes 970 to recommend certain supply chain management actions (e.g. rebalance inventory levels across warehouses or adjust inventory review schedules), and processes 980 to trigger automated actions on the supply chain (e.g. automatically generate and submit purchase orders). In some embodiments, these downstream processes may also write to the supply chain data store to add new supply chain data or adjust synthetic data generation parameters for future data generation. In some embodiments, the depicted process may be repeated according to a configured schedule or workflow, so that synthetic supply data is repeatedly generated into the supply chain data store under specified conditions.

Figure 8:
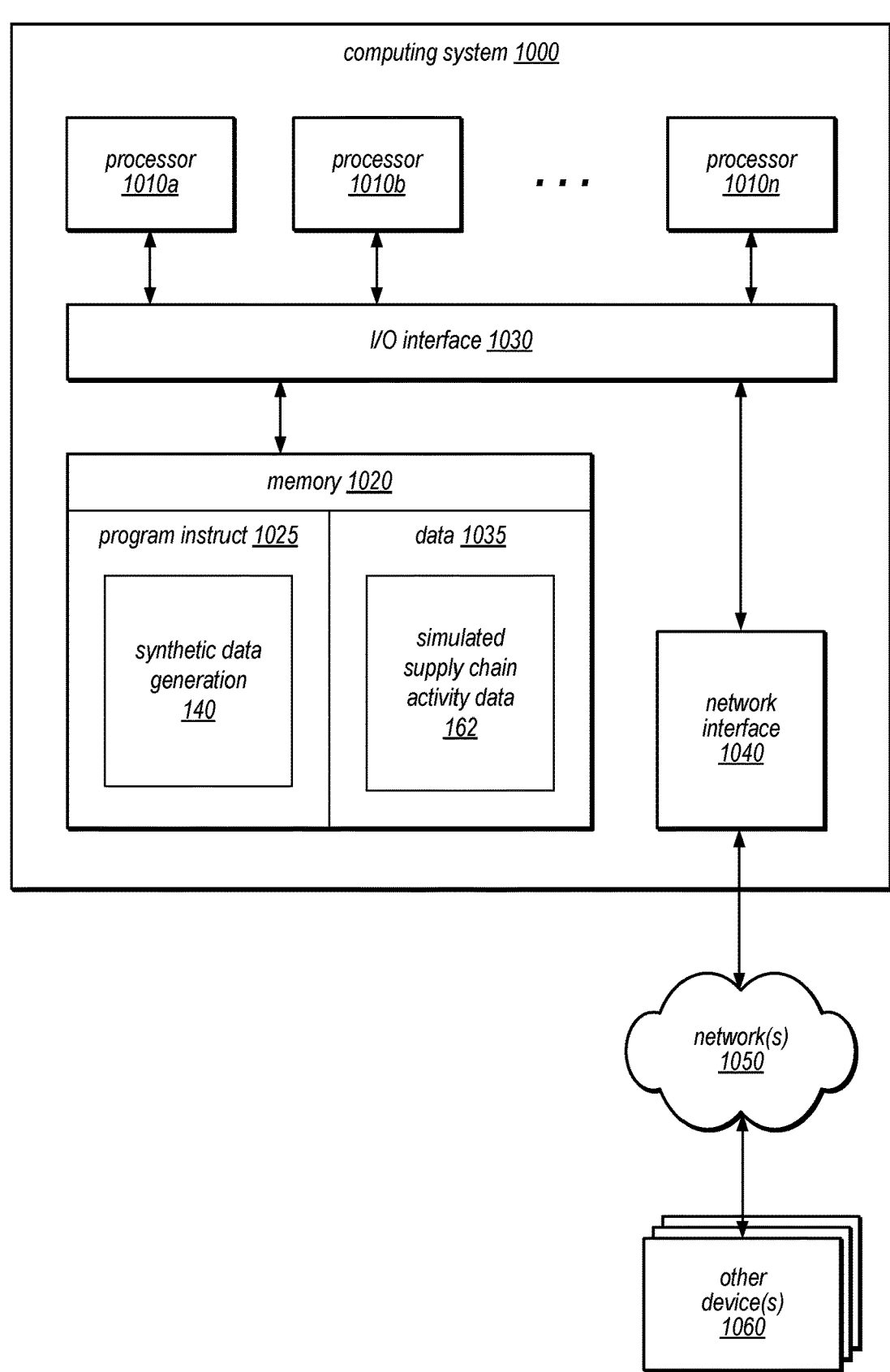
FIG. 8 is a block diagram illustrating an example computer system that can be used to implement one or more portions of the SCMS, according to some embodiments.

FIG. 8 is a block diagram illustrating an example computer system that can be used to implement one or more portions of the SCMS, according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement one or more executable components such as the synthetic data generation system 140 of FIG. 1. As shown, in some embodiments, the data memory 1035 may be used to store data such as the simulated supply chain activity data 162 of FIG. 1.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

one or more processors with associated memory that implement a supply chain management system (SCMS), configured to:

receive supply chain data about a supply chain network, including data about a list of fulfillment centers, a list of vendors, and respective products supplied by the vendors;

generate synthetic supply chain activity data over successive simulated periods using the supply chain data, including to, for a current period:

simulate an inventory level of a product (P) supplied by a vendor (V) at a fulfillment center (FC);

forecast a demand of P to be fulfilled by FC over one or more next periods;

generate a purchase order (PO) for P based at least in part on the simulated inventory level and the forecasted demand, wherein the PO indicates a submission time of the PO and a requested quantity of P; and generate a receipt time for the PO, wherein the receipt time is the time the quantity of P is received from the vendor, and is generated based at least in part on a stochastic function of the supply chain data; and train a machine learning model to predict a vendor lead time (VLT) for individual purchase orders submitted in the supply chain network, wherein the machine learning model is trained using purchase orders generated by the SCMS, including submission and receipt times of the purchase orders.

2. The system of claim 1, wherein:

the SCMS is implemented as a service provided by a multi-tenant infrastructure service provider network; and the synthetic supply chain activity data is generated according to one or more configuration parameters received via a configuration interface of the service.

3. The system of claim 1, wherein the SCMS is configured to generate additional synthetic supply chain activity data for another supply chain network and use the additional synthetic supply chain activity data to:

train or validate another machine learning model for the other supply chain network, simulate a scenario on the other supply chain network, assess or monitor the other supply chain network for a type of health risk, recommend one or more actions on the other supply chain network, or trigger one or more automated actions on the other supply chain network.

4. The system of claim 1, wherein the SCMS is configured to store supply chain data and supply chain activity data for a plurality of real supply chain networks under a unified data schema; and generate the synthetic supply chain activity data in accordance with the unified data schema.

5. The system of claim 1, wherein the machine learning model is trained using a selected set of attributes from the synthetic supply chain activity data and the supply chain data, including one or more of:

a time difference between the submission time and the receipt time of the PO, a VLT metric for V, P, and FC of the PO calculated over one or more previous periods before the purchase order, a number of purchase orders for P submitted in the one or more previous periods, a quantity of P requested in the one or more previous periods, a product category of P, and a weekday when the PO is submitted.

6. The system of claim 1, wherein the machine learning model is a quantile regression model trained using one or more quantile loss functions.

7. A method, comprising:

performing, by a supply chain management system (SCMS) implemented by one or more processors with associated memory:

receiving supply chain data about a supply chain network, including data about one or more fulfillment centers, one or more vendors, and one or more products supplied by the one or more vendors;

generating synthetic supply chain activity data over successive simulated periods using the supply chain data, including for a current period:

generating a purchase order (PO) for a product (P) supplied by a vendor (V) to be shipped to a fulfillment center (FC), wherein the PO indicates a submission time of the PO and a requested quantity of P determined based at least in part on a simulated inventory level of P at FC and a forecasted demand of P; and generating a receipt time for the PO, wherein the receipt time is the time the quantity of P is received from the vendor, and is generated based at least in part on a stochastic function of the supply chain data; and training a machine learning model to predict a vendor lead time (VLT) for individual purchase orders submitted in the supply chain network, wherein the machine learning model is trained using purchase orders generated by the SCMS, including submission and receipt times of the purchase orders.

8. The method of claim 7, wherein at least some of the supply chain data includes synthetic supply chain data generated by the SCMS, including synthetic data about one or more of:

a simulated fulfillment center in the supply chain network, a simulated vendor in the supply chain network, and a simulated product supplied by the supply chain network.

9. The method of claim 7, further comprising generating, by the SCMS, synthetic supply chain data about a simulated vendor in the supply chain network, including an outage schedule for the simulated vendor.

10. The method of claim 7, further comprising generating, by the SCMS, a review schedule for simulated reviews of inventory levels at FC, wherein the PO is generated in periods when a simulated review is scheduled.

11. The method of claim 7, further comprising determining, by the SCMS, a buying period for the PO, wherein the buying period is used to determine the forecasted demand of P, and the buying period is determined based at least in part on one or more vendor metrics of V.

12. The method of claim 7, wherein the PO includes one or more of:

a lifecycle code of the PO, a confirmation time of the PO, a cancellation time of the PO, a vendor shipment time of the PO, and a specified delivery window of the PO.

13. The method of claim 7, wherein the PO includes multiple PO lines that indicate respective products and respective quantities of the respective products, and training data used to train the machine learning model are organized as records of individual PO lines.

14. The method of claim 7, wherein the stochastic function is based at least in part on a Gamma distribution specified as one or more configuration parameters.

15. The method of claim 7, wherein:

the SCMS is configured to store supply chain data and supply chain activity data for a plurality of real supply chain networks under a unified data schema; and the synthetic supply chain activity data is generated in accordance with the unified data schema.

16. The method of claim 7, wherein the machine learning model is trained using a selected set of attributes from the synthetic supply chain activity data and the supply chain data, including one or more of:

a time difference between the submission time and the receipt time of the PO, a VLT metric for V, P, and FC of the PO calculated over one or more previous periods before the purchase order, a number of purchase orders for P submitted in the one or more previous periods, a quantity of P requested in the one or more previous periods, a product category of P, and a weekday when the PO is submitted.

17. The method of claim 7, wherein the machine learning model is a quantile regression model trained using one or more quantile loss functions.

18. One or more non-transitory computer-accessible storage media storing program instructions that when executed on one or more processors of a supply chain management system (SCMS) cause the SCMS to:

receive supply chain data about a supply chain network, including data about one or more fulfillment centers, one or more vendors, and one or more products supplied by the one or more vendors;

generate synthetic supply chain activity data over successive simulated periods using the supply chain data, including to, for a current period:

generate a purchase order (PO) for a product (P) of a vendor (V) to be shipped to a fulfillment center (FC), wherein the PO indicates a submission time of the PO and a requested quantity of P determined based at least in part on a simulated inventory level of P at FC and a forecasted demand of P; and generate a receipt time for the PO, wherein the receipt time is the time the quantity of P is received from the vendor, and is generated based at least in part on a stochastic function of the supply chain data; and train a machine learning model to predict a vendor lead time (VLT) for individual purchase orders submitted in the supply chain network, wherein the machine learning model is trained using purchase orders generated by the SCMS, including submission and receipt times of the purchase orders.

19. The non-transitory computer-accessible storage media of claim 18, wherein the program instructions when executed on the one or more processors cause the SCMS to tarin the machine learning model using a selected set of attributes of the synthetic supply chain activity data, including one or more of:

a time difference between the submission time and the receipt time of the PO, a VLT metric for V, P, and FC of the PO calculated over one or more previous periods before the purchase order, a number of purchase orders for P submitted in the one or more previous periods, a quantity of P requested in the one or more previous periods, a product category of P, and a weekday when the PO is submitted.

20. The non-transitory computer-accessible storage media of claim 18, wherein the program instructions when executed on the one or more processors cause the SCMS to generate at least some of the supply chain data, including synthetic data about one or more of:

a simulated fulfillment center in the supply chain network, a simulated vendor in the supply chain network, and a simulated product supplied by the supply chain network.

* * * * *